(12) United States Patent
Shirakawa

(10) Patent No.: US 7,501,959 B2
(45) Date of Patent: Mar. 10, 2009

(54) SIGNAL INCOMING DIRECTION ESTIMATION APPARATUS

(75) Inventor: Kazuo Shirakawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 237 days.

(21) Appl. No.: 11/212,288

(22) Filed: Aug. 26, 2005

(65) Prior Publication Data
US 2006/0261968 A1    Nov. 23, 2006

(30) Foreign Application Priority Data
May 23, 2005  (JP)  ............... 2005-149569

(51) Int. Cl.
*G08B 21/00*  (2006.01)

(52) U.S. Cl. ............... 340/671; 340/539.1; 340/572.7; 340/664; 340/686.1; 342/147; 342/417; 342/437; 343/745; 343/860

(58) Field of Classification Search ............... 340/671, 340/539.1, 572.1, 10.1, 572.2, 10.2, 10.3, 340/10.4, 10.33, 10.5, 686.1, 572.7, 664; 342/129, 463, 147, 417, 437; 343/745, 860; 455/410, 418, 193.1
See application file for complete search history.

(56) References Cited

U.S. PATENT DOCUMENTS

| | | | | |
|---|---|---|---|---|
| 6,882,868 B1 * | 4/2005 | Shattil | ............... | 455/562.1 |
| 6,903,656 B1 * | 6/2005 | Lee | ............... | 340/572.1 |
| 6,917,337 B2 * | 7/2005 | Iida et al. | ............... | 343/702 |
| 7,049,933 B1 * | 5/2006 | Koerner | ............... | 340/10.1 |
| 7,095,311 B2 * | 8/2006 | Coates et al. | ............... | 340/10.41 |
| 7,119,738 B2 * | 10/2006 | Bridgelall et al. | ............... | 342/129 |
| 7,148,803 B2 * | 12/2006 | Bandy et al. | ............... | 340/539.16 |
| 7,196,656 B2 * | 3/2007 | Shirakawa | ............... | 342/147 |
| 7,342,548 B2 * | 3/2008 | Taniguchi et al. | ............... | 343/742 |

FOREIGN PATENT DOCUMENTS

| | | |
|---|---|---|
| JP | 6-281715 | 10/1994 |
| JP | 2003-304112 | 10/2003 |

OTHER PUBLICATIONS

European Search Report dated Jul. 28, 2006.
David V. Thiel. "Switched parasitic antennas and controlled reactance parasitic antennas : A systems comparison" Antennas and Propagation Society Symposium, Jun. 20, 2004, pp. 3211-3214, XP010722068.

* cited by examiner

*Primary Examiner*—Davetta W Goins
(74) *Attorney, Agent, or Firm*—Katten Muchin Rosenman LLP

(57) ABSTRACT

A signal incoming direction estimation apparatus is constructed so as to comprise a sensor array having plural sensors and the impedance of each of the sensors being set to a predetermined value, respectively, and a variable impedance adjustment means having a variable impedance, being selectively connected to any one of the sensors of the sensor array, and controlling the current distribution of each of the above-mentioned sensors. Due to this, it becomes possible for the signal incoming direction estimation apparatus to carry out a beam scan only by manipulating at least one impedance without simultaneously manipulating all of the sensor impedances and thereby a high-speed beam scan (directional control) becomes possible.

17 Claims, 7 Drawing Sheets

SIGNAL INCOMING DIRECTION ESTIMATION APPARATUS

CROSS REFERENCE TO RELATED APPLICATIONS

This application is based on and hereby claims priority to Japanese Application No. 2005-149569 filed on May 23, 2005 in Japan, the contents of which are hereby incorporated by reference.

BACKGROUND OF THE INVENTION

1) Field of the Invention

The present invention relates to a signal incoming direction estimation apparatus and, more particularly, to a technique suitable for use in a wireless system for detecting the incoming angle of a signal (electromagnetic wave) using a sensor array.

2) Description of Related Art

FIG. 7 shows a block diagram of an apparatus for estimating the incoming direction of electromagnetic waves as an example of a signal incoming direction estimation apparatus. The electromagnetic wave incoming direction estimation apparatus shown in FIG. 7 employs a uniformly-spaced linear array antenna (hereinafter, abbreviated to ULA, occasionally) 100 the number of sensor elements (antennas) of which is $N_A$ (in this example, $N_A$=9) and the intervals of antennas of which a red as a receiving system, and estimates the incoming direction of electromagnetic waves by utilizing the fast Fourier transform (FFT). In other words, it is an FMCW (Frequency Modulated Continuous Wave) radar apparatus for detecting the azimuth of a target object by frequency-converting a beat signal obtained by mixing a transmitted signal and a received signal and carrying out a beam scan to the converted signal.

The FMCW radar apparatus comprises, as its essential parts, the ULA 100 having $N_A$ elements (antennas) 101 arranged at uniform intervals (d), an RF down-converter 200 for obtaining a beat signal in the baseband frequency band by mixing a signal (RF signal) received by the ULA 100 and a transmitted RF signal and frequency-converting (down converting) it, a low pass filter (LPF) 300, and an A/D converter 400, and a CPU 500 as a receiving system, and at the same time, comprising a baseband oscillator (triangle wave oscillator) 600, an up-converter 700 for frequency-converting (up converting) a signal at the oscillation frequency (baseband frequency) of the oscillator 600 into an RF signal, and a transmitting antenna 800 as a transmitting system.

The ULA 100 is provided with switches 102, 103, 104, and 105 and by these switches 102, 103, 104, and 105, the antenna 101 to receive a signal (to input the received signal into the RF down-converter 200) is switched to another in a time division manner as will be described later. The RF down-converter 200 has a low noise amplifier (LNA) 201 and a mixer 202 and the received signal from the ULA 100 is, after low-noise amplification by the LNA 201, mixed by the mixer 202 with a signal from an RF voltage control oscillator 701 (that is, the transmitting RF signal) shared by the up-converter 700 and thus a beat signal in the baseband frequency band, that is, a signal having a delay time, a Doppler frequency shift, and a beat frequency determined by the relative distance and the relative velocity between the present radar apparatus and the target object can be obtained.

Further, in the transmitting system, the up-converter 700 comprises the above-mentioned RF voltage control oscillator (RF-VCO) 701 driven by the output voltage signal (modulation control signal) of the baseband oscillator 600 and outputting an RF signal (transmission modulation signal), a high power amplifier (HPA) 703 for amplifying the output of the RF voltage control oscillator 701 to a predetermined signal level in accordance with the sensing distance, and a hybrid circuit (HYB) 702 for branching the output of the RF voltage control oscillator 701 into two and supplying one to the HPA 703 and the other to the mixer 202 of the RF down-converter 200.

Next, the operation of the radar apparatus constructed as described above, particularly, the operation of the receiving system is explained below. In the following explanation, each antenna 101 shown in FIG. 7 is denoted by symbol Ak (k=1 to $N_A$) where $A_I$ denotes the nearest antenna 101 to the transmitting antenna 800 (letting position of the antenna 101 be the origin) among the antennas 101 constituting the receiving ULA 100 shown in FIG. 7.

First, if it is assumed that Ns of independent signals $x_m$ (t) arrive at the ULA 100 with angles $\theta_m$ (m=1 to Ns) at time t, the phase difference between the signals $x_m$ (t) arriving at the antenna $A_I$ and the antenna $A_k$ is expressed by the following expression (1.1) with the origin being the phase reference.

$$\phi_m^k = \frac{2\pi}{\lambda}(k-1)d\sin(\theta_m) \tag{1.1}$$

Therefore, the output $v_k$ (t) from the antenna $A_k$ is expressed, along with the noise signal $n_k$ (t), by the following expression (1.2).

$$v_k(t) = \sum_{m=1}^{N_s} x_m(t)\exp(j\phi_m^k) + n_k(t) \tag{1.2}$$

However, it is assume that each signal is a baseband representation and that the direction of an incoming angle is positive if the direction is in the clockwise direction with respect to the Y-axis (0°).

Next, it is assumed that the period of the signal $x_m$ (t) is $T_m$, $N_T$ of samples taken in from each of the antennas $A_k$ during the period $T_m$ are vectorized into $v_k$ as shown in the following expression (1.3), and the Fourier transform thereof is $V_k$ as shown in the following expression (1.4).

$$v_k = [v_k(l) \ldots v_k(N_T)] \tag{1.3}$$

$$V_k = [V_k(l) \ldots V_k(N_T)] \tag{1.4}$$

However, $V_k$ (l) (l=1 to $N_T$) is expressed by the following expression (1.5) where the Fourier transform coefficients of $x_m$ (t) and $n_k$ (t) are $X_m$ (l) and $N_k$ (l), respectively.

$$V_k(l) = \sum_{m=1}^{N_s} X_m(l)\exp(j\phi_k^m) + N_k(l) \tag{1.5}$$

Finally, if $V_k$ (l) multiplied by $\exp(-j\phi k^q)$ and summed in terms of k is expressed by $V_q$ (l), the following expression (1.6) is obtained, $$V_q(l) = \sum_{k=1}^{N_A} V_k(l)\exp(-j\phi_k^q) \tag{1.6}$$

-continued $$= \sum_{m=1}^{N_S} X_m(l) \left\{ \sum_{k=1}^{N_A} \exp[j(\phi_k^m - \phi_k^q)] \right\} +$$

$$\sum_{k=1}^{N_A} N_k(l) \exp(-j\phi_k^q)$$

where the inside of the brackets { } of the above-mentioned expression (1.6) is an array factor for m-th (m=1 to $N_s$) signal expressed by the following expression (1.7), and it will be found that the in-phase condition is satisfied and there exists a peak when $\theta_q = \theta_m$.

$$\sum_{k=1}^{N_A} \exp\left\{ j\frac{2\pi}{\lambda}(k-1)d[\sin(\theta_m) - \sin(\theta_q)] \right\} \quad (1.7)$$

Therefore, if the above-mentioned expression (1.6) is calculated while changing l and $\theta_q$, the position on the frequency index: l and the angle index: q of each signal source is known as the sum of the array factors weighted with the spectrum $X_m$(l) of the baseband signal. The calculation (digital signal processing) is carried out by the CPU 500 for a beat signal having passed from the RF down-converter 200 through the LPF 300 and having been digitized by the A/D converter 400.

Here, it is necessary to realize pointed directional beams using a number of sensor elements (antennas) 101 in order to separate signal sources closely adjacent angularly to each other with a radar apparatus (signal incoming direction estimation apparatus) using the ULA 100. In the frequency band for which the variations in the hardware performance and the cost cause no problem, the object can be attained by simply preparing the baseband generation circuits (the RF down-converter 200, the LPF 300, the A/D converter 400, etc., shown in FIG. 7) of the same number as that of the sensor elements, but in the frequency band for which the above-mentioned problems cannot be ignored (for example, a millimeter wave band such as a 76 GHz band), it is a mandatory item required by the system development to reduce the number of baseband generation circuits.

Then, in the signal incoming direction estimation apparatus in such a frequency band, as shown in FIG. 7, the above-mentioned switches 102, 103, 104, and 105 are arranged for each of the sensor elements 101 and these switches are switched at a certain timing to share the baseband generation circuit (the RF down-converter, the LPF 300, the A/D converter 400, etc.) in a time division manner and thereby the antenna beam is formed by the digital signal processing (this is referred also to as an electronic scan system). An example of this type of signal incoming direction estimation apparatus (switching beam former) is disclosed, for example, in the following Patent Document 1.

[Patent Document 1] Japanese Patent Laid-Open (Kokai) HEI 6-281715

However, in the above-described configuration, the following problems arise.

(1) As the number $N_A$ of sensor elements increases, the simultaneity of the signals obtained from each of the sensor elements 101 collapses and in particular, in such a case where the signal source is moving, there is the possibility that the original purpose of the apparatus to estimate the incoming direction cannot be attained.

(2) To realize the switches 102, 103, 104, and 105 whose losses are small and variations in characteristics is small will become more difficult as the frequency to be handled becomes higher. Particularly, the construction shown in FIG. 7 has a disadvantage because losses are caused to occur by the switches 102, 103, 104, and 105 at the previous stage of the LNA 201.

(3) Further, in order to avoid the electromagnetic interaction between the switches 102, 103, 104, and 105, it is necessary to widen the distance between the switches 102, 103, 104, and 105 and this will reduce the relative proportion of the area occupied by the functional components on the layout pattern of an IC (that is, the cost is raised).

SUMMARY OF THE INVENTION

The above-mentioned problems being taken into consideration, the present invention has been developed and an object thereof is to provide a signal incoming direction estimation apparatus capable of obviating a switch for time division switching of antennas (sensors) and of carrying out a high-speed beam scan without manipulating all the sensor impedances.

In order to attain the above-mentioned object, a signal incoming direction estimation apparatus of the present invention is:

(1) characterized by comprising a sensor array having plural sensors and the impedance of each of the sensors being set to a predetermined value, respectively and a variable impedance adjustment means having a variable impedance, being selectively connected to any one of the sensors of the sensor array, and controlling the current distribution of each of the sensors.

(2) Here, the signal incoming direction estimation apparatus may comprise a time division switch section for connecting each of the above-mentioned sensors to the variable impedance adjustment means in a time division manner.

(3) Further, the sensor and the variable impedance adjustment means may be coupled electromagnetically.

(4) The impedance of each of the sensors may be made variable.

(5) The sensor array may be constructed as an ESPAR (Electronically Steerable Passive Array Radiator) type sensor array for electromagnetically coupling each of the sensors.

(6) The signal incoming direction estimation apparatus may further comprise a monitor means for monitoring the output power of either or both of the output of each of the sensors and the output of the variable impedance adjustment means and a control means for adjusting the impedance of the variable impedance adjustment means based on the output power monitored by the monitor means.

(7) The monitor means may be constructed so as to comprise a wave detector for detecting the output of each of the sensors.

(8) The monitor means may be constructed so as to comprise a branch circuit for branching part of the output of the variable impedance adjustment means and inputting it into the control means.

(9) The time division switch section may be constructed by using a MEMS (Micro Electro Mechanical System) technique.

According to the present invention, it is possible to carry out a beam scan only by manipulating at least one of the impedances (of the impedance tuner) without simultaneously manipulating all the sensor impedances because the variable impedance adjustment means selectively connected to any one of the sensors and controlling the current distribution of each sensor is provided. Therefore, a high-speed beam scan (directional control) is possible. Further, the switch for time division switching of the sensors can be obviated.

Furthermore, if the impedance of each of the above-mentioned sensors is made variable, a more flexible and more detailed beam scan can be realized.

DESCRIPTION OF THE PREFERRED EMBODIMENTS

Hereinafter, embodiments of the present invention are explained with reference to drawings.

[A] Explanation of Outline

Figure 1:
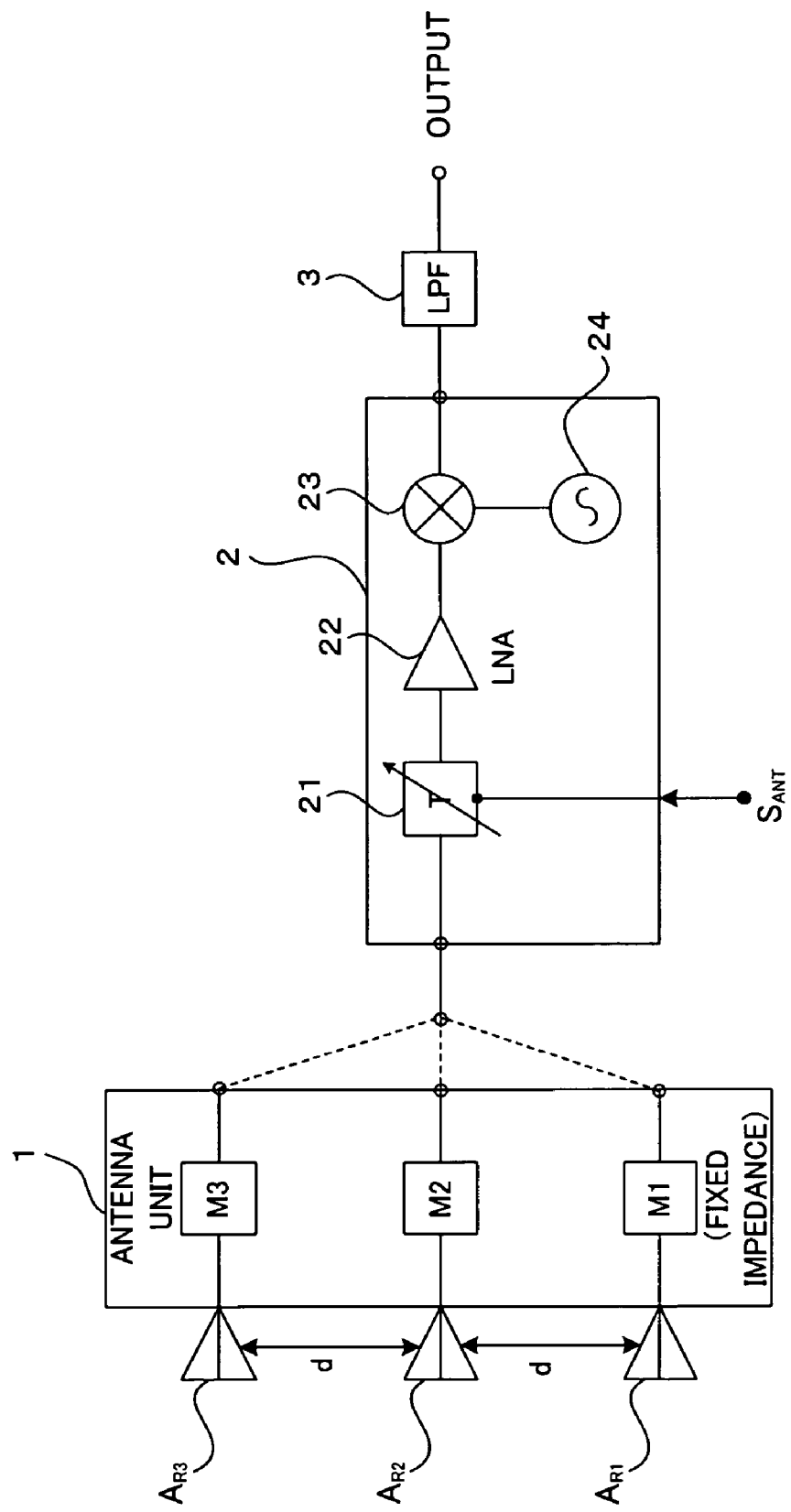
FIG. 1 is a block diagram for explaining the outline of a signal incoming direction estimation apparatus in an embodiment of the present invention.

FIG. 1 is a block diagram for explaining the outline of a signal incoming direction estimation apparatus in an embodiment of the present invention. The signal incoming direction estimation apparatus shown in FIG. 1 comprises, as a receiving system, an antenna unit (ULA) 1 forming an antenna array in which $N_A$ ($N_A$=3 in FIG. 1) of sensor elements (antennas) $A_{RK}$ (k=1 to $N_A$) are arranged at element intervals d, an RF down-converter (frequency converter), for example, connected physically to or coupled electromagnetically to each of the antennas $A_{RK}$ of the antenna unit 1, to which a radio signal received by any one of the antennas $A_{RK}$ is input, and down-converting the radio signal into a baseband signal, and a low pass filter (LPF) 3 for passing only the low-frequency components of the baseband signal from the RF down-converter 2 and removing unwanted noise components. The transmitting system is not shown schematically here.

The RF down-converter 2 is provided with an impedance tuner (T) 21, a low noise amplifier 22, a mixer 23, and a local oscillator 24 and a signal (beat signal) in the baseband frequency band is obtained by mixing the received signal from the antenna unit 1 and the output signal (transmitting signal) of the local oscillator 24 in the mixer (frequency conversion section) 23 to carry out frequency conversion (down conversion). Prior to the frequency conversion, low-noise amplification of the received signal is also carried out by the LNA 22.

Further, by means of the impedance tuner 21, the impedance of the feeding point can be adjusted.

As described above, when $N_A$ of the antennas $A_{RK}$ arranged at the element intervals d form the array, the characteristics of the antenna array can be expressed by the following expression (2.1) where the current distribution of each of the antennas $A_{RK}$ is denoted by $I_k$ (k=1 to $N_A$) and the wavelength of an RF signal is λ.

$$G(\theta) = \sum_{k=1}^{N_A} I_k \exp\left[ j \frac{2\pi(k-1)d}{\lambda} \sin(\theta) \right] \qquad (2.1)$$

Here, in expression (2.1), since $I_k$ is a current induced by each of the antennas $A_{RK}$, when, for example, $N_A$=3, if the impedance of each of the antennas $A_{R1}$, $A_{R2}$, and $A_{R3}$ is set to an appropriate value (so as to trace a constant reactance circle on the Smith chart, for example) in the respective matching circuits $M_K$ ($M_1$, $M_2$, $M_3$) and the impedance of the feeding point is adjusted y the impedance tuner 21 and matched to the matching circuits $M_1$, $M_2$, and $M_3$ sequentially, the distribution of $I_K$ changes in accordance with the matching state and as a result, it is possible to electronically scan beams (to control the beam direction).

This operation will be made easier to understand if it is assumed that the operation is controlled by the electricity supply to the parallel resistors or an ESPAR (Electronically Steerable Passive Array Radiator) antenna is operated by source pull, and depending on the incoming direction estimation method or the adjustable range of the tuner that can be realized, it becomes possible to considerably reduce the number of IC ports.

[B] Concrete Example 1

Figure 2:
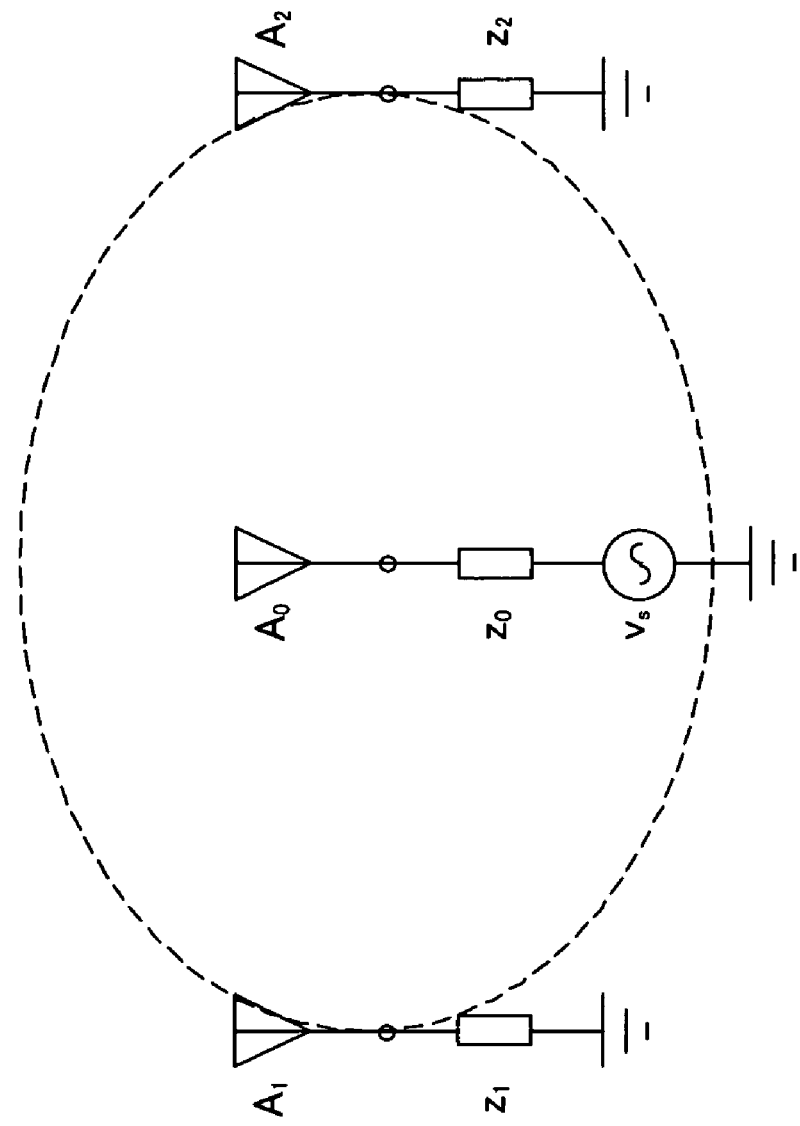
FIG. 2 is a diagram for explaining concrete example 1 of a signal incoming direction estimation apparatus in an embodiment of the present invention.

When $N_A$+1 (this denotation follows the denotation of antenna number of an ordinary ESPAR system) of antennas are arranged as shown in FIG. 2 as the above-mentioned antenna unit 1, in other words, when an ESPAR antenna in which passive antennas $A_1$, $A_2$, ... are arranged in the vicinity of an antenna (feeding antenna) $A_0$ to which a feeding voltage $V_s$ is supplied is applied, if it is assumed that an admittance matrix of the array antenna itself, seen from each antenna terminal, is $Y_A$ (not terminated), an impedance matrix consisting of terminal elements is $Z_T$=diag ($z_0$, $z_1$, ... $z_{NA}$), and further the antenna terminal voltage vector is V, and the current is I, the following expressions (2.2) and (2.3) hold for U=(1, 0 ..., 0)$^t$.

$$V = v_s U - Z_T I \qquad (2.2)$$

$$I = Y_A V \qquad (2.3)$$

Here, by substituting expression (2.2) into expression (2.3) and modifying expression (2.3) to a certain extent, the following expression is obtained.

$$I = Y_A V = Y_A (v_s U - Z_T I) \Rightarrow I = Y_A V = v_s (Y_A^{-1} + Z_T)^{-1} U \qquad (2.4)$$

For simplicity of explanation, it is assumed that $N_A=2$ and $Y_A^{-1}=Z_A$, then, $$I = v_s(Z_A + Z_T)^{-1}U \quad (2.5)$$

$$= v_s \begin{bmatrix} z_{00}+z_0 & z_{01} & z_{02} \\ z_{10} & z_{11}+z_1 & z_{12} \\ z_{20} & z_{21} & z_{22}+z_2 \end{bmatrix}^{-1} U$$

$$= \frac{v_s}{\Delta} \begin{bmatrix} (z_{11}+z_1)(z_{22}+z_2) - z_{12}z_{21} \\ z_{10}(z_{22}+z_2) - z_{12}z_{20} \\ z_{10}z_{21} - (z_{11}+z_1)z_{20} \end{bmatrix}$$

$$\equiv \frac{v_s}{\Delta} \begin{bmatrix} y_0 \\ y_1 \\ y_2 \end{bmatrix}$$

$$\Delta = (z_{00}+z_0)y_0 - z_{01}y_1 + z_{02}y_2 \quad (2.6)$$

In an ordinary ESPAR antenna, in the case of FIG. 2, a beam scan is carried out by changing the current of each of the antennas $A_0$, $A_1$, and $A_2$ by manipulating the terminal impedances $z_1$ and $z_2$ of the passive antennas $A_1$ and $A_2$, however, in the present embodiment, the terminal impedances $z_1$ and $z_2$ are fixed to certain values (the above-mentioned $y_0$, $y_1$, and $y_2$: constant) and the impedances $z_0$ of the feeding point (feeding antenna $A_0$) is changed. In order to make clear, the above-mentioned expressions (2.5) and (2.6) are modified to a certain extent and the following expression (2.7) is obtained.

$$I = \frac{v_s}{z_0 + z_{00} - z_{01}\frac{y_1}{y_0} + z_{02}\frac{y_2}{y_0}} \begin{bmatrix} 1 \\ y_1/y_0 \\ y_2/y_0 \end{bmatrix} \quad (2.7)$$

For example, if the impedance of the impedance tuner 21 is set as the following expressions (2.8) and (2.9), $$z_0 + z_{00} = z_{01}\frac{y_1}{y_0} \Rightarrow I = \frac{v_s}{z_{02}} \begin{bmatrix} y_0/y_2 \\ y_1/y_2 \\ 1 \end{bmatrix} \quad (2.8)$$

$$z_0 + z_{00} = -z_{02}\frac{y_2}{y_0} \Rightarrow I = \frac{v_s}{-z_{01}} \begin{bmatrix} y_0/y_1 \\ 1 \\ y_2/y_1 \end{bmatrix} \quad (2.9)$$

it is possible to change the currents $i_1$ and $i_2$ for a beam form antenna. Therefore, it is possible to carry out the beam operation (directional control) and a high-speed beam scan without manipulating (adjusting) the impedances $z_0$, $z_1$, and $Z_2$ of all of the antennas $A_0$, $A_1$, and $A_2$. As a result, even in a case where a signal source is moving (a case where it is applied to a moving wireless communication system), it is possible to accurately estimate the incoming direction of a signal from the moving signal source.

By the way, as a matter of course, it may also be possible to make the terminal impedances $z_1$ and $z_2$ of the passive antennas $A_1$ and $A_2$ variable in addition to the impedance $z_0$ of the feeding antenna $A_0$, which is a feeding point, in order to carry out a more flexible scan (beam scan) or a detailed directional control.

[C] Concrete Example 2

Figure 3:
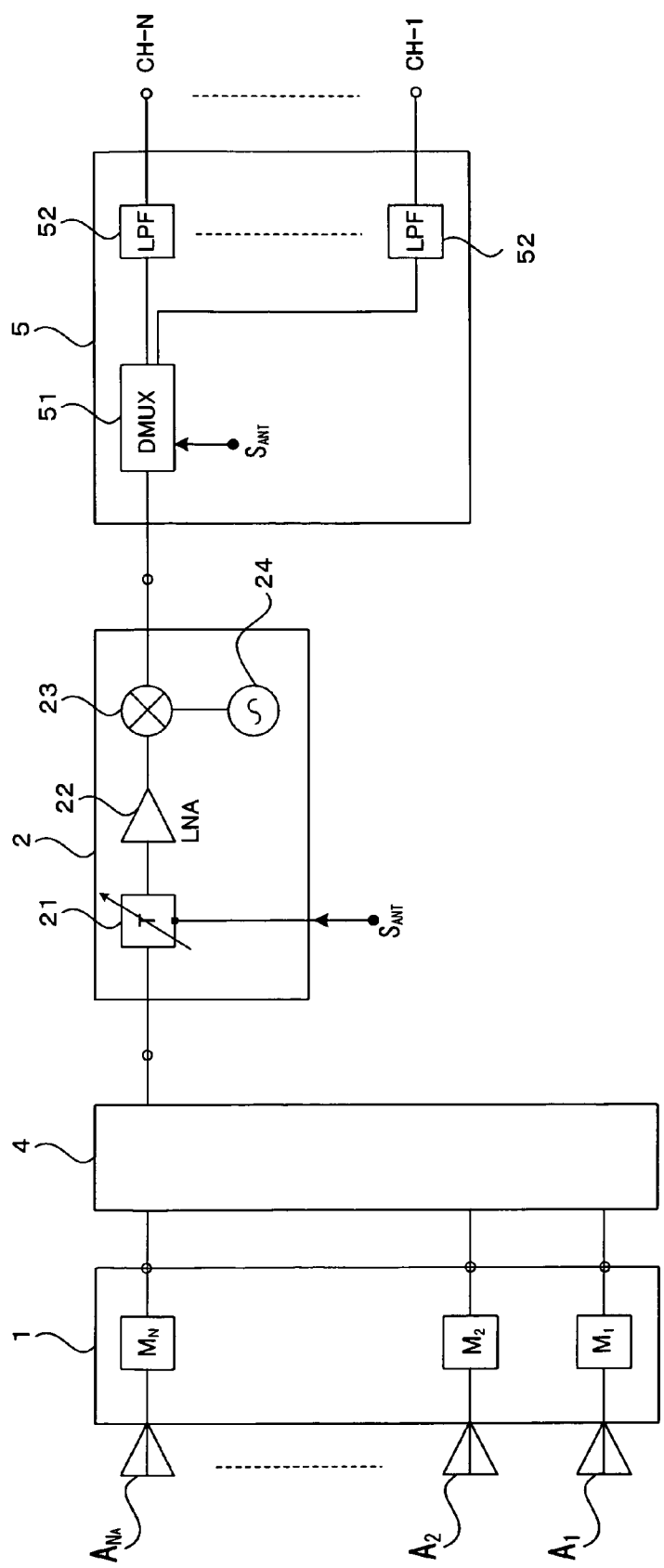
FIG. 3 is a diagram for explaining concrete example 2 of a signal incoming direction estimation apparatus in an embodiment of the present invention.

Next, a concrete example of the apparatus is explained with reference to FIG. 3. FIG. 3 is a block diagram showing essential parts of a wireless apparatus (beam former) as the signal incoming direction estimation apparatus of the present invention and the wireless apparatus shown in FIG. 3 comprises, as a receiving system, the antenna unit (ULA) 1 having $N_A$ sensor elements (antennas) $A_k$ (k=1 to $N_A$) arranged at an element interval d, and having $N_A$ matching circuits $M_k$ for setting the impedance of each of the antennas $A_k$ to an appropriate value, a switch section 4 for selectively (in a time division manner) outputting the radio signal received by each of the antennas $A_k$ (that is, each of the antennas $A_k$ is selectively connected to the RF down-converter 2 in the post stage in a one-to-one manner), the RF down-converter (frequency converter) 2 for frequency-converting (down converting) the received signal (RF signal) from the switch section 4 into the baseband signal, and a baseband unit 5 for separating the output (baseband signal) of the RF down-converter 2 for each of $N_A$ channels. The transmitting system is not shown here.

In the present embodiment also, the RF down-converter 2 is provided with the impedance tuner 21, the LNA 22, the mixer 23, and the local oscillator 24 and a signal (beat signal) in the baseband frequency band is obtained by mixing the received signal from the antenna unit 1 and the output signal (transmitting signal) of the local oscillator 24 in the mixer 23 to carry out frequency conversion (down conversion). Prior to the frequency conversion, the low-noise amplification of the received signal is also carried out by the LNA 22. Further, by means of the impedance tuner 21, the current distribution of each of the antennas $A_k$ can be adjusted by adjusting the impedance of the feeding point. Here it is possible for the impedance tuner 21 to take at least $N_A$ (for example, $Z_1^*$, $Z_2^*$, $Z_{NA}^*$) or more states (impedances). By the way, it may be possible to apply, in place of the impedance tuner 21, an apparatus such as a phase shifter that carries out the equivalent functions to the impedance tuner 21.

Further, the baseband unit 5 is provided with a demultiplexing section (DMUX) 51 and a low pass filter 52 the number of which corresponding to the number of antennas $N_A$ ($N_A$ is the number of channels), respectively, and the beat signals from the RF down-converter 2 are separated for each channel in the demultiplexing section 51 and each beat signal passes through its corresponding LPF 52, thereby a beat signal can be obtained for each channel. The beat signal obtained for each channel is input to a digital signal processor such as CPU, although not shown, and a required digital signal processing such as FFT is carried out.

As the switch section 4, a switch that has employed a MEMS (Micro Electro Mechanical System) technique, which is capable of direct input/output port switching, and the loss of which is low is used.

Here, the operation is explained with reference to FIG. 4 (A) and FIG. 4 (B) on the assumption that the impedance of each of the antennas $A_k$ seen from the RF down-converter 2 is $Z_1$ to $Z_{NA}$ by the matching circuits $M_1$ to $M_N$ and for simplicity, $Z_1=R+jX$, $Z_2=R+j2X$, ..., $Z_{NA}=R+jN_AX$. Here FIG. 4 (A) and FIG. 4 (B) each show a case where $N_A=2$.

Figure 4B:
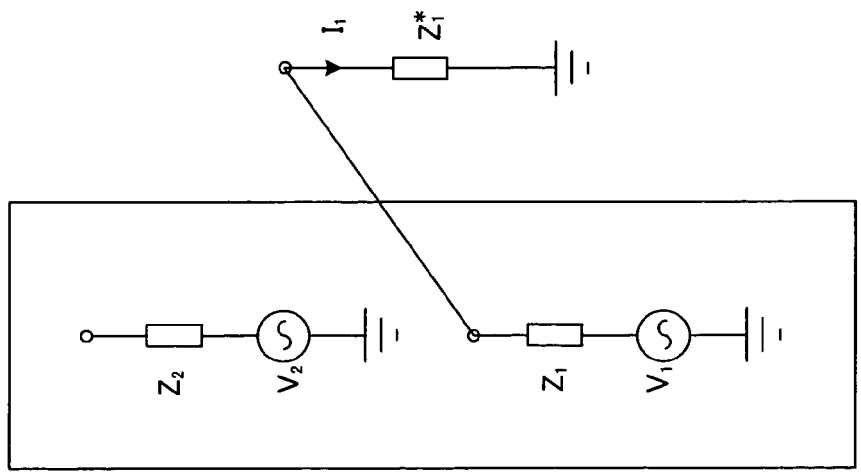
FIG. 4(A) and FIG. 4(B) are both diagrams for explaining the operation of the signal incoming direction estimation apparatus shown in FIG. 3.
Figure 4A:
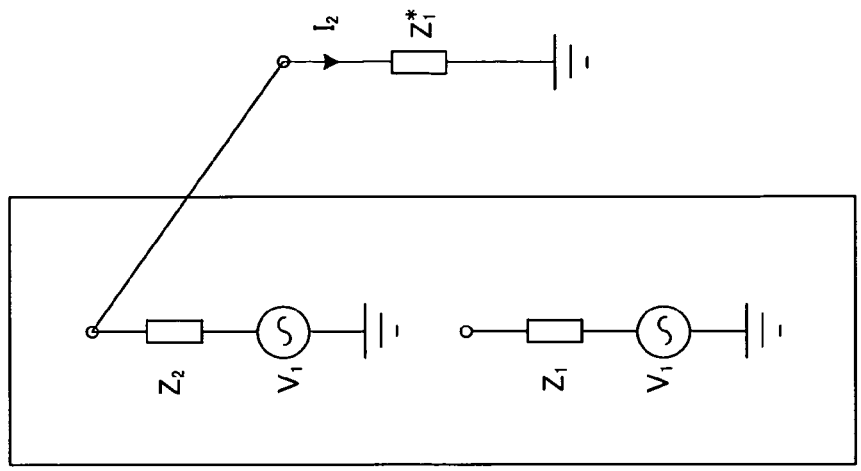

First, as shown in FIG. 4 (A), if the impedance of the impedance tuner 21 is set to $Z_1^*$ and the first antenna $A_1$ is selected by the switch section 4, the antenna current is $I_1=V_1/2R$, and if the second, ..., or the $N_A$-th antenna $A_{NA}$ is selected, the antenna current is $I_2=V_1/[2R+jX]$, ..., or $I_N=V_1/[2R+j(N_A-1)X]$, therefore, in this case, the antenna beam shows the maximum directionality in the direction of the first antenna.

Further, as shown in FIG. 4 (B), if the impedance of the impedance tuner 21 is set to $Z_2^*$ then considering in the same manner, the respective antenna currents are $I_1=V_1/[2R-jX]$, $I_2=V_1/2R, \ldots, I_N=V_1/[2R+j(N_A-2)X]$, and in this case, the antenna beam shows the maximum directionality in the direction of the second antenna. Similarly, by changing the impedance of the impedance tuner 21, it is possible to form (scan) the antenna beam so as to show the maximum directionality in the direction of the third, . . . , or the $N_A$-th antenna.

As described above, in the sensor array (ULA) 1 composed of $N_A$ antennas (sensors) $A_k$, it is possible to adjust the current distribution of each of the sensors $A_k$ to carry out the beam scan of the sensor array by setting the respective sensor impedances to respective appropriate values (predetermined values) in advance or adaptively, arranging the impedance tuner 21 capable of taking at least $N_A$ states (impedances) or more between the ULA 1 and the down-converter 2 (mixer 23), and manipulating the impedance of the tuner 21.

Therefore, while it is necessary for an ordinary ESPAR beam former to simultaneously manipulate the $N_A$ sensor impedances, in the present embodiment, a high-speed beam scan becomes possible by manipulating only one impedance (of the impedance tuner 21) after once designed. Compared to a switching beam former, it is possible to considerably reduce the number of IC ports due to the adjustable region of the tuner that can be realized.

Figure 5:
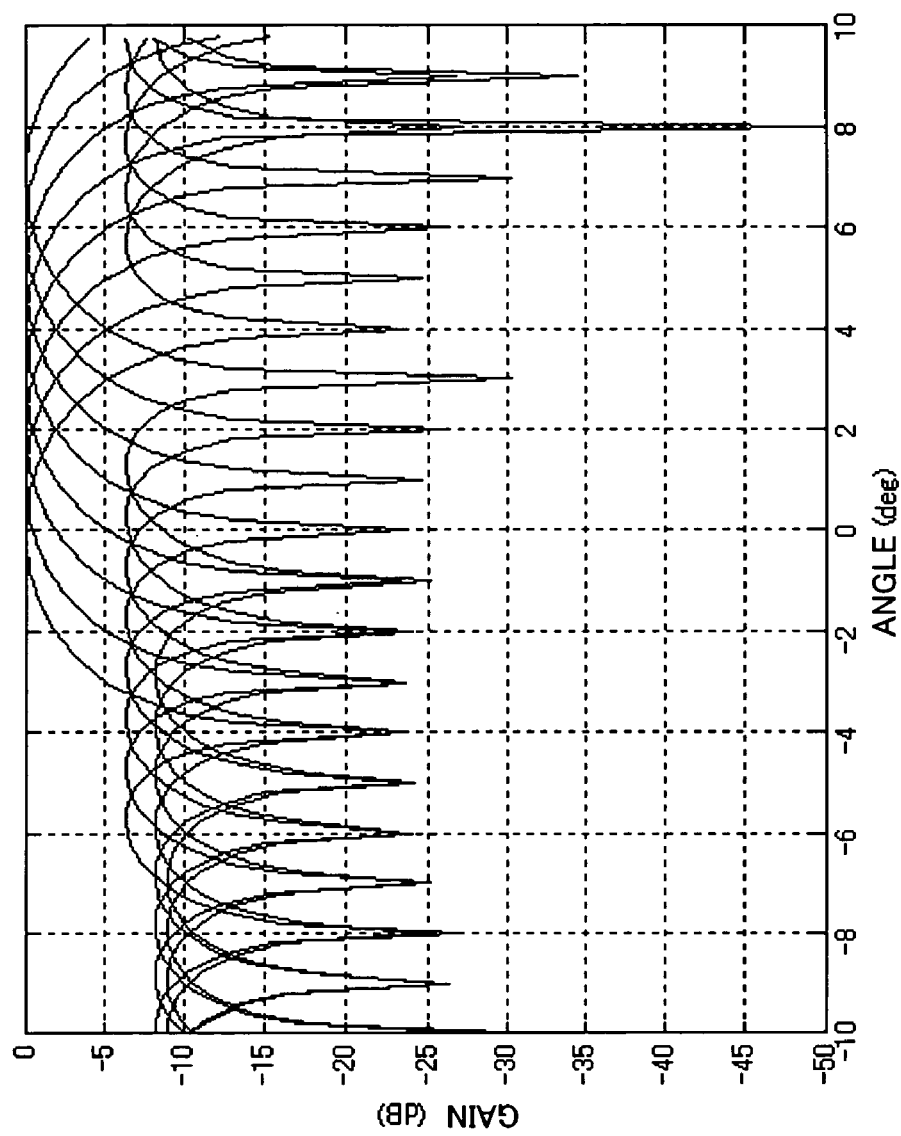
FIG. 5 is a diagram showing how a beam scan is carried out by a signal incoming direction estimation apparatus in an embodiment of the present invention.

FIG. 5 shows how the beam scan is carried out in the present embodiment. In FIG. 5, an example is shown, where the impedance of the impedance tuner 21 is changed into eight states, and it will be understood that it is possible to form a beam having eight peak gains in accordance with each state.

[D] Concrete Example 3

Figure 6:
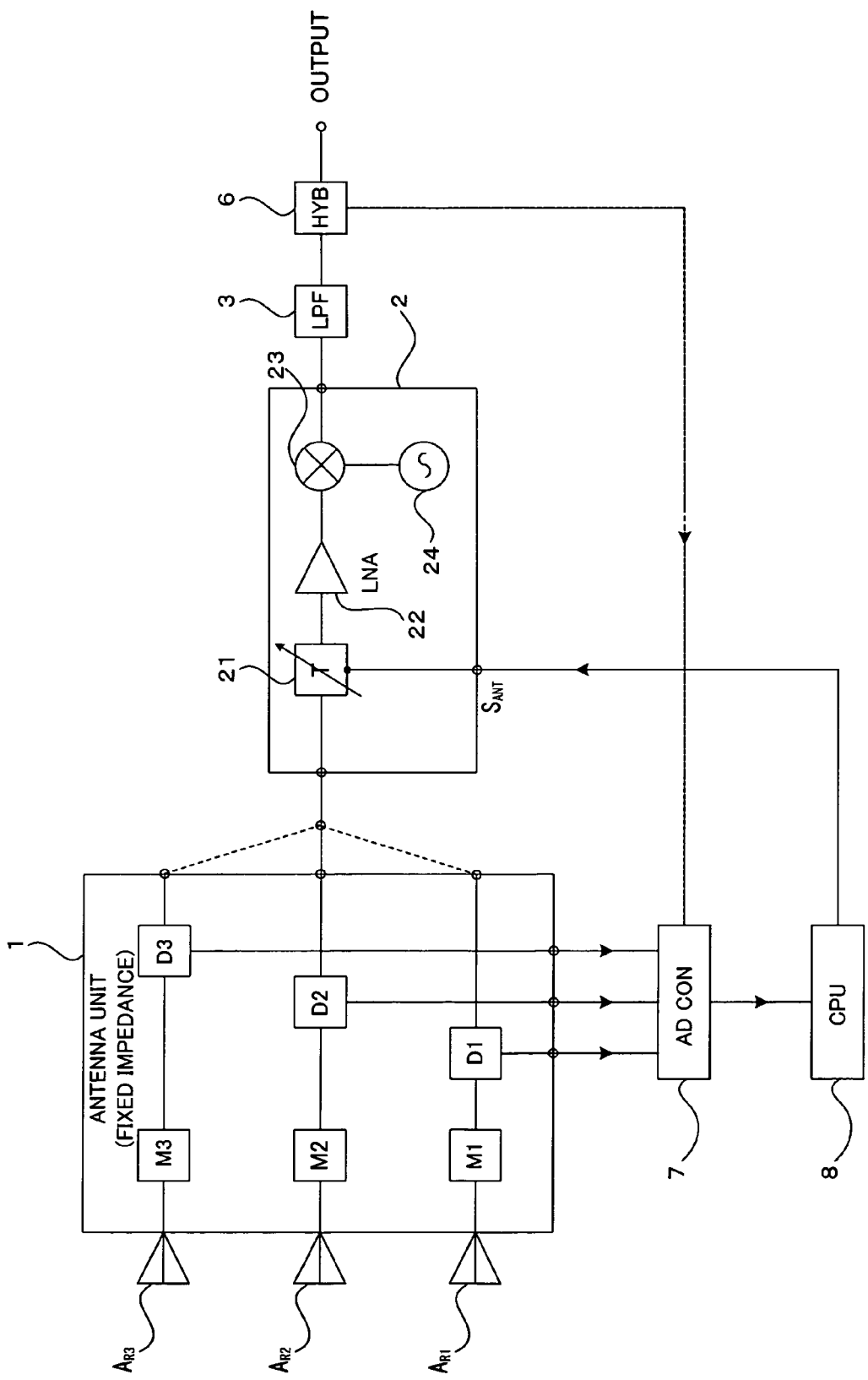
FIG. 6 is a block diagram showing a modification example of an essential construction of a wireless apparatus (beam former), which is a signal incoming direction estimation apparatus in an embodiment of the present invention.
Figure 7:
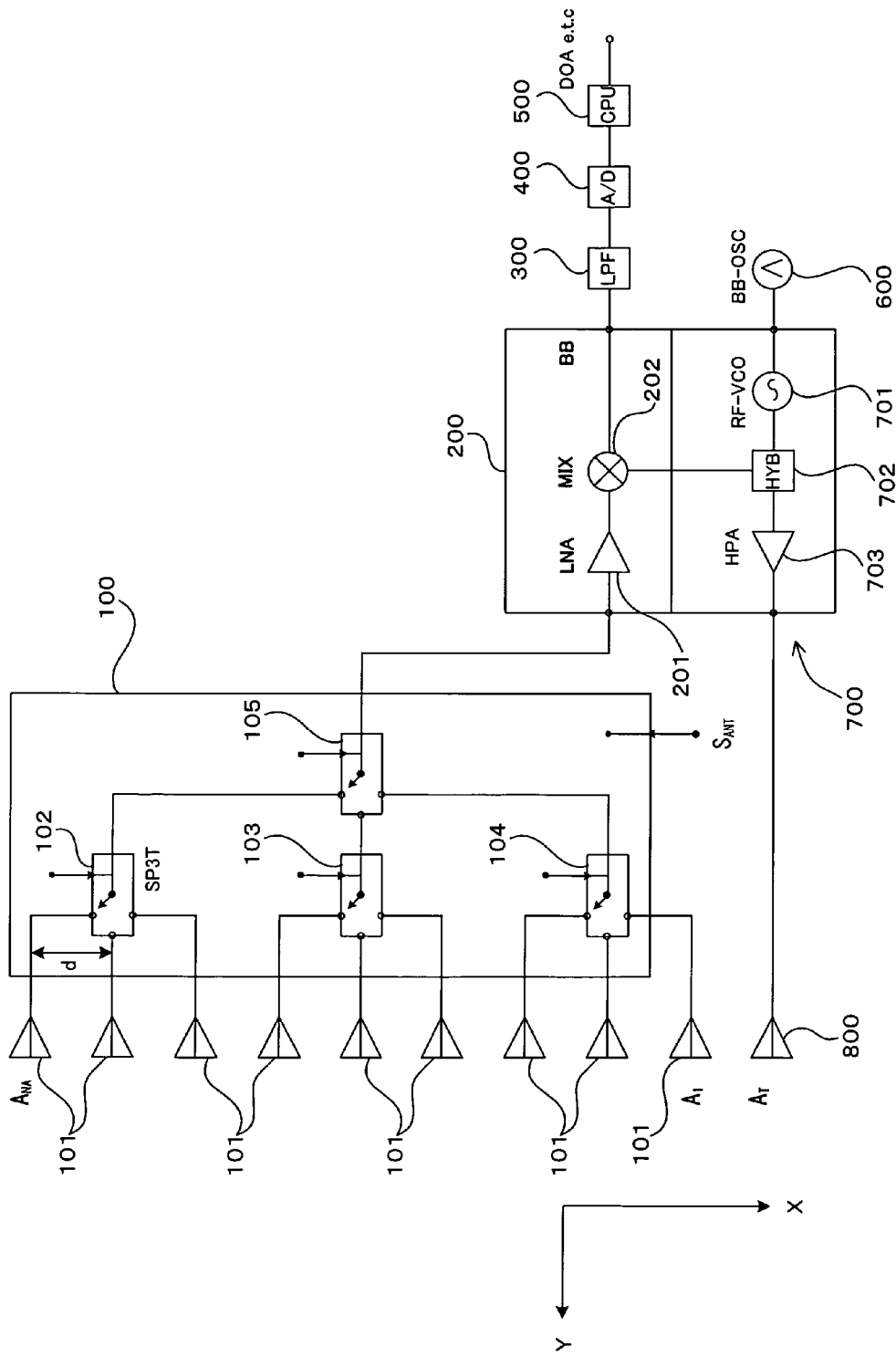
FIG. 7 is a diagram showing an example of a conventional signal incoming direction estimation apparatus.

FIG. 6 is a block diagram showing a modified example of the essential parts of a wireless apparatus (beam former), which is a signal incoming direction estimation apparatus in an embodiment of the present invention. The construction of the wireless apparatus shown in FIG. 6 differs from the construction shown in FIG. 1 in that in the antenna unit (ULA) 1, $N_A$ wave detectors $D_k$ are provided in order to monitor the output power of each of the antennas $A_{Rk}$ and at the same time, a hybrid circuit (HYB) 6 for branching part of output of the LPF 3 in the post stage of the LPF 3, an A/D converter 7 for analog-to-digital converting each output of the above-mentioned wave detectors $D_k$ (or the output branched from the hybrid circuit 6) into a digital signal, and a CPU (control means) 8 for adaptively adjusting the impedance of the impedance tuner 21 in the RF down-converter 2 based on the digital output of the A/D converter 7 are added. In FIG. 6 also, the transmitting system is not shown. In FIG. 6, the parts to which the same symbols as those already described are attached are the same as or similar to those already described unless otherwise specified.

In the wireless apparatus (beam former) in the present embodiment constructed as described above, the output power of each of the antennas $A_{Rk}$ (or the output power of the RF down-converter 2) is monitored by the CPU 8 through each of the above-mentioned wave detectors $D_k$ (or the hybrid circuit 6) and the A/D converter 7, the impedance of the impedance tuner 21 is controlled (adjusted) adaptively so as to provide the maximum received power (or the minimum angular measurement error), and the amount of offset of the terminal impedance is adjusted. Due to this, it becomes possible to smooth the variations in manufacture of the antennas $A_{Rk}$, etc.

[E] Others

An optimum combination of the impedances of each of the above-mentioned matching circuits $M_k$ can be obtained by using an already-known neural network in which, for example, the impedance of each of the antennas $A_{Rk}$ and the impedance tuner 21 are regarded as an input and the received power or the measured angle are regarded as an output (for example, refer to K. Shirakawa, et al. "Structural Determination of Multilayered Large-Signal Neural-Network HEMT Model", IEEE TRANSACTIONS ON MICROWAVE THEORY AND TECHNIQUES, VOL. 46, NO. 10, October 1998 etc.)

Further, in a construction in which the setting of the impedances of each of the antennas $A_{Rk}$ and the impedance tuner 21 is carried out digitally, an optimum combination can also be obtained by associating the impedance values that each impedance can take with a series of numbers, assuming a virtual biotic group having these numbers as a chromosome, and applying a genetic algorithm on the assumption that the received power, the error rate, or the estimated angular error is the fitness of the individual in the biotic group.

The present invention is not limited to the embodiments described above and it is needless to say that various modifications can be embodied without departing from the concept of the present invention.

As described above in detail, according to the present invention, since the impedance tuner (variable impedance adjustment means) selectively connected to any one of sensors (antennas) for controlling the current distribution of each sensor is provided, it is possible to carry out a beam scan only by manipulating at least one impedance (of the impedance tuner) without simultaneously manipulating all the sensor impedances. Therefore, a high-speed beam scan is possible and the present invention is thought to be extremely useful in the radio communication technique field, particularly, in the mobile radio communication and radar technique fields.

What is claimed is:

1. A signal incoming direction estimation apparatus comprising:
    a sensor array having plural sensors and the impedance of each of said sensors being set to a predetermined value, respectively; and
    a variable impedance adjustment means having a variable impedance, being selectively connected to any one of the sensors of said sensor array, and controlling the current distribution of each of said sensors.

2. The signal incoming direction estimation apparatus according to claim 1, further comprising a time division switch section for connecting each of said sensors to said variable impedance adjustment means in a time division manner.

3. The signal incoming direction estimation apparatus according to claim 1, wherein said sensor and said variable impedance adjustment means are coupled electromagnetically.

4. The signal incoming direction estimation apparatus according to claim 1, wherein the impedance of each of said sensors is also variable.

5. The signal incoming direction estimation apparatus according to claim 1, wherein said sensor array is constructed as an ESPAR (Electronically Steerable Passive Array Radiator) type sensor array for electromagnetically coupling each of said sensors.

6. The signal incoming direction estimation apparatus according to claim 1, further comprising:
    a monitor means for monitoring the output power of either or both of the output of each of said sensors and the output of said variable impedance adjustment means; and a control means for adjusting the impedance of said variable impedance adjustment means based on the output power monitored by said monitor means.

7. The signal incoming direction estimation apparatus according to claim 2, wherein the impedance of each of said sensors is also variable.

8. The signal incoming direction estimation apparatus according to claim 2, wherein said sensor array is constructed as an ESPAR (Electronically Steerable Passive Array Radiator) type sensor array for electromagnetically coupling each of said sensors.

9. The signal incoming direction estimation apparatus according to claim 2, wherein said time division switch section is constructed by using a MEMS (Micro Electro Mechanical System) technique.

10. The signal incoming direction estimation apparatus according to claim 7, wherein said sensor array is constructed as an ESPAR (Electronically Steerable Passive Array Radiator) type sensor array for electromagnetically coupling each of said sensors.

11. The signal incoming direction estimation apparatus according to claim 3, wherein the impedance of each of said sensors is also variable.

12. The signal incoming direction estimation apparatus according to claim 3, wherein said sensor array is constructed as an ESPAR (Electronically Steerable Passive Array Radiator) type sensor array for electromagnetically coupling each of said sensors.

13. The signal incoming direction estimation apparatus according to claim 11, wherein said sensor array is constructed as an ESPAR (Electronically Steerable Passive Array Radiator) type sensor array for electromagnetically coupling each of said sensors.

14. The signal incoming direction estimation apparatus according to claim 4, wherein said sensor array is constructed as an ESPAR (Electronically Steerable Passive Array Radiator) type sensor array for electromagnetically coupling each of said sensors.

15. The signal incoming direction estimation apparatus according to claim 6, wherein said monitor means is constructed so as to comprise a wave detector for detecting the output of each of said sensors.

16. The signal incoming direction estimation apparatus according to claim 6, wherein said monitor means is constructed so as to comprise a branch circuit for branching part of the output of said variable impedance adjustment means and inputting it into said control means.

17. The signal incoming direction estimation apparatus according to claim 15, wherein said monitor means is constructed so as to comprise a branch circuit for branching part of the output of said variable impedance adjustment means and inputting it into said control means.

* * * * *